Dec. 30, 1969     F. O. NELSON     3,486,231
END TUBE FOR ORTHODONTIC ARCH WIRE
Filed May 29, 1967     2 Sheets-Sheet 2
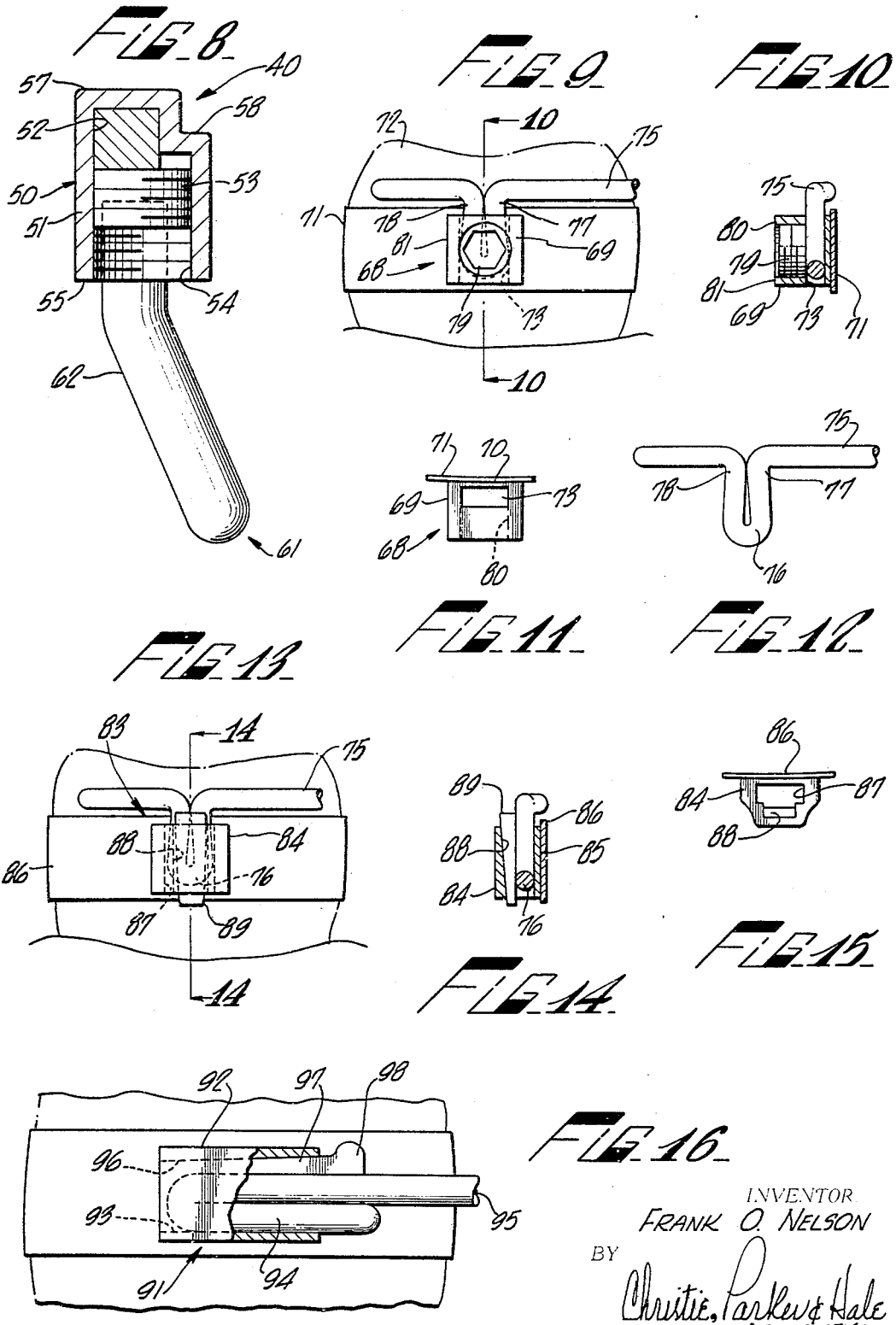
INVENTOR
FRANK O. NELSON
BY
Christie, Parker & Hale
ATTORNEYS.

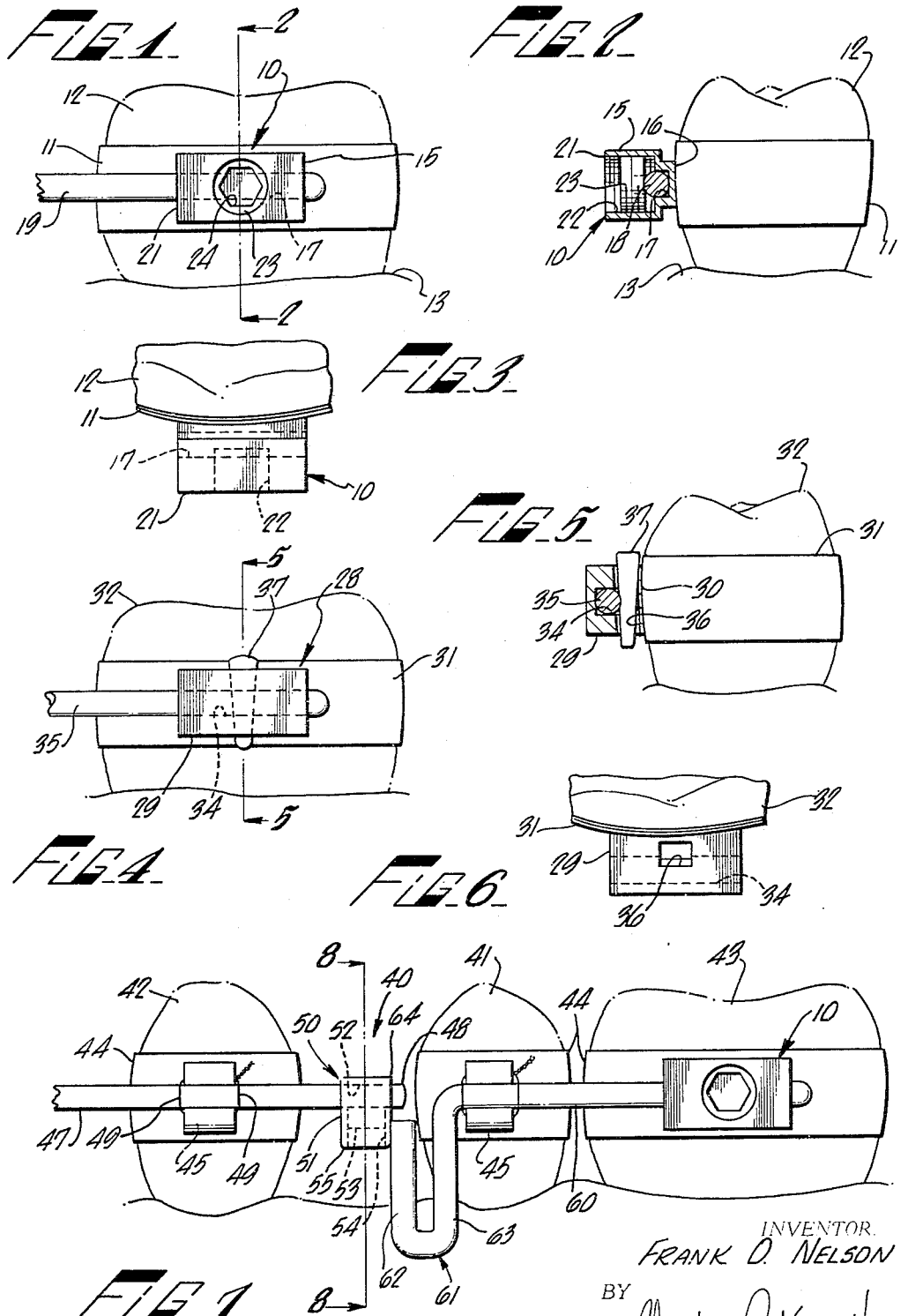

United States Patent Office 3,486,231
Patented Dec. 30, 1969

3,486,231
END TUBE FOR ORTHODONTIC ARCH WIRE
Frank O. Nelson, 15410 La Belle St.,
Hacienda Heights, Calif. 91745
Filed May 29, 1967, Ser. No. 641,842
Int. Cl. A61c 7/00
U.S. Cl. 32—14                                    7 Claims

ABSTRACT OF THE DISCLOSURE

An end tube for anchoring a distal end of an orthodontic arch wire to a tooth. The tube is rigidly secured to a molar tooth band, and has a body portion forming a continuous enclosure around the arch wire so the wire can be removed or installed only axially of the passage. The arch wire is secured in the end tube by a readily releasable locking member such as a wedge or a set screw.

BACKGROUND OF THE INVENTION

An orthodontic arch wire is a generally U-shaped stainless-steel wire which is mounted to extend around the dental arch of a patient undergoing orthodontic treatment. The wire may be round, or may have a square or rectangular cross section, depending on the treatment technique selected by the orthodontist. The arch wire is used to deliver corrective forces to malpositioned teeth which are to be moved in the dental arch, and is also used to anchor properly located teeth in position while malpositioned teeth are being moved.

The arch wire may be mounted labially on the outside of the dental arch or lingually on the inside of the arch. In both of these orientations, it is usually necessary to anchor the ends of the arch wire to teeth (normally molar teeth) toward the rear of the arch. The anchor teeth are typically fitted with tooth bands, and the bands carry buccal tubes to receive the ends of a labial arch wire or lingual sheaths to receive the ends of a lingual arch wire. These tubes or sheaths thus define sockets into which the ends of the arch wire are inserted.

Substantial forces are imposed on the arch wire, and it is necessary in most cases to provide some auxiliary lock, latch or tie-back to insure that the arch-wire end is reliably secured in the socket of the tube or sheath. In the past, this has required the orthodontist to weld or solder latches, hooks, or other devices to the arch wire, and to ligate the wire end in place or perhaps to form special bends in the arch wire to engage a latch or detent on a lingual sheath. These auxiliary devices are time consuming for the orthodontist (and hence expensive for the patient) to construct and mount, and have often proved to be unreliable in use. There thus exists a need for a simple and reliable apparatus for anchoring the ends of an arch wire.

The end tube of this invention meets this need, and incorporates a locking member which is readily installed, provides a secure and reliable locking action, and is easily and quickly released when the arch wire is to be adjusted or removed. The locking member is a wedge or a threaded element adapted to be received in the body of the end tube to bear against the arch-wire end. The end tube is formed as a buccal tube when positioned on the outside of the dental arch, and is formed as either a horizontal or vertical sheath when positioned on the inside of the arch.

SUMMARY OF THE INVENTION

Briefly stated, the invention contemplates the combination of an orthodontic arch wire having an end to be anchored, and an end tube having a body portion with an elongated passage therethrough to receive the arch-wire end. The body portion forms a continuous enclosure around the arch wire whereby the wire is confined laterally of the passage and can be removed and installed only axially of the passage. The body portion defines an opening communicating with the passage, and a locking member is releasably engaged in the opening and urged against the arch-wire end to secure the arch wire to the body portion.

In one form, the locking member is a socket-head set screw which is threaded into the opening against the arch-wire end. In another form, a tapered wedge is used to lock the arch wire in place. The invention also contemplates the use of a contraction loop in combination with the end tube as secured to a distal end of a sectional or partial anterior arch wire.

BRIEF DESCRIPTION OF THE DRAWINGS

The invention will be described in detail with reference to the attached drawings, in which:

FIG. 1 is a buccal elevation of a molar tooth mounting a tooth band which carries an end tube according to the invention;

FIG. 2 is a side or distal view along line 2—2 of FIG. 1;

FIG. 3 is a top or occlusal view of the end tube shown in FIG. 1, with the arch wire and set screw removed;

FIG. 4 is a buccal elevation of another form of the end tube which incorporates a wedge locking member;

FIG. 5 is a distal side view along line 5—5 of FIG. 4;

FIG. 6 is a buccal top view of the end tube shown in FIG. 4 without the wedge locking member and arch wire;

FIG. 7 is a buccal elevation of a contraction loop coupled with an end tube according to the invention;

FIG. 8 is a view on line 8—8 of FIG. 7;

FIG. 9 is a lingual elevation of a vertical lingual sheath formed according to the invention;

FIG. 10 is a mesial side view along line 10—10 of FIG. 9;

FIG. 11 is an occlusal top view of the lingual sheath shown in FIG. 9, without the arch wire and set screw;

FIG. 12 is an elevation of an arch wire having a loop at its end for engagement with the lingual sheath;

FIG. 13 is a lingual elevation of another form of the lingual sheath incorporating a wedge locking member;

FIG. 14 is a view on line 14—14 of FIG. 13;

FIG. 15 is an occlusal top view of the sheath shown in FIG. 13 without the arch wire and wedge; and FIG. 16 is a lingual elevation of a horizontal lingual sheath according to the invention.

DESCRIPTION OF THE PREFERRED EMBODIMENTS

Referring to FIGS. 1–3, an end tube 10 according to the invention is secured to a conventional tooth band 11 mounted on a lower molar tooth 12 above gum tissue 13. The end tube includes a body portion 15 which is elongated mesiodistally and has a lingual face 16 welded or soldered to the tooth band. The body portion is oriented on the outside of the dental arch to serve as a buccal tube, and extends buccally away from the tooth band. An elongated passage 17 is formed mesiodistally through the body portion, and an end 18 of an orthodontic arch wire 19 is received in the passage. Preferably, passage 17 is rectangular in cross section to accept either round or rectangular arch wires.

Body portion 15 has a buccal face 21, and a threaded opening 22 is formed centrally in the body portion to extend lingually from the buccal face into passage 17 as best seen in FIGS. 2 and 3. An Allen screw 23 having a hexagonal socket 24 therethrough is threaded into opening 22, and the screw bears against the arch wire to lock the wire in the end tube. An Allen screw of about 0.045 inch diameter has been found satisfactory for use with an arch-wire passage 17 measuring about 0.022 inch by 0.028 inch.

Another form of the invention is shown in FIGS. 4–6 in which an end tube 28 includes a body portion 29 with a lingual face 30 soldered or welded to a tooth band 31 cemented to a molar tooth 32. Body portion 29 has a rectangular passage 34 extending mesiodistally therethrough, and an arch wire 35 (which may be round, rectangular or square in cross section) is received in the passage. An opening 36 extends occlusogingivally through the central part of the body portion between the arch wire and lingual face 30. Preferably, opening 36 is slightly tapered as best seen in FIG. 5, and the opening communicates with the lingual side of passage 34.

A wedge 37 is inserted in opening 36 to bear against the arch wire whereby the arch wire is locked in the body portion of the end tube. Preferably, wedge 37 is formed from a slightly resilient plastic such as an acrylic plastic. The wedge may also be made from metal, and in this form preferably has slightly roughened faces to increase the frictional engagement with the walls of opening 36 and the arch wire.

In FIGS. 7 and 8, the invention is shown in the form of a contraction appliance 40. This appliance is useful for closing extraction spaces created when, for example, a first bicuspid is extracted between second bicuspid 41 and cuspid 42 shown in FIG. 7. A first molar 43 is used as an anchor tooth, and all the teeth carry conventional tooth bands 44. Conventional orthodontic brackets 45 are secured to the tooth bands on bicuspid 41 and cuspid 42, and an end tube 10 as described above is secured to the tooth band on the first molar.

An anterior arch wire 47 extends around the front of the arch, and terminates in an end 48 slightly distally of cuspid 42. The anterior arch wire is secured in bracket 45 on the cuspid tooth by a conventional ligature wire 49.

Contraction appliance 40 includes an end tube 50 having a body portion 51 with a rectangular passage 52 formed mesiodistally therethrough. End 48 of the anterior arch wire is received in passage 52, and is secured to the body portion by an Allen screw 53 threaded into an opening 54 which extends occlusogingivally from a gingival face 55 of the body portion into communication with passage 52. The body portion has an occlusal face 57 which has a downward step 58 at its buccal side to avoid an occlusal interference with a mating cuspid tooth (not shown) in the other dental arch.

A posterior arch wire 60 is secured at its distal end in end tube 10 on molar tooth 43, and is ligated to orthodontic bracket 45 on second bicuspid 41. The mesial end of the posterior arch wire is formed into a contraction loop 61 having a mesial arm 62 and a distal arm 63. The mesial arm of the contraction loop is secured by soldering or welding to a distal face 64 of body portion 51 of the end tube. The arms of the contraction loop are formed to be urged toward each other whereby a corrective force is delivered to the teeth to close the extraction space between second bicuspid 41 and cuspid 42. As best seen in FIG. 8, the gingival end of contraction loop 61 is bent buccally to clear the gum tissue from which the teeth extend.

As corrective movement of the teeth occurs, the appliance is reactivated by loosening Allen screw 53 and sliding body portion 51 of the end tube mesially along anterior arch wire 47 toward cuspid tooth 42. The Allen screw is then turned against the anterior arch wire to lock the end tube in place when a desired amount of reactivation has been achieved. Reactivation is quickly and easily accomplished, and the need for forming and attaching special auxiliary appliances as have been necessary in the past is completely eliminated.

The end tube of this invention is also useful as a lingual sheath to anchor the end of a lingual arch wire mounted on the inside of a dental arch. Referring to FIGS. 9–12, an end tube 68, suitable for use as a vertical lingual sheath, includes a body portion 69 having a buccal face 70 secured to a tooth band 71 cemented to a molar tooth 72. The body portion has a vertical passage 73 extending therethrough.

A lingual arch wire 75 has a distal end 76 formed into a gingivally extending loop having a pair of juxtaposed arms 77 and 78. The end of the arch wire is received in passage 73, and the arch wire is secured in the body portion by an Allen screw 79 threaded into an opening 80 which extends buccally from a lingual face 81 of the body portion into communication with passage 73. Preferably, the hexagonal socket in Allen screw 79 extends entirely through the screw body to provide an adequate seat for an Allen wrench (not shown) used to turn the screw.

The end tube of this invention is also useful as a vertical lingual sheath having a wedge locking member, and this form of the invention is shown in FIGS. 13–15. An end tube 83 includes a body portion 84 having a buccal face 85 secured to a tooth band 86. A passage 87 extends occlusogingivally through the body portion, and distal end 76 of lingual arch wire 75 is received in the passage. A tapered opening 88 is formed occlusogingivally in the body portion in communication with the lingual side of passage 87. A tapered wedge 89 similar to wedge 37 described above is inserted in opening 88 to lock the end of the arch wire in the passage.

The end tube of this invention is also useful as a horizontal lingual sheath, and this embodiment is shown in FIGURE 16. An end tube 91 includes a body portion 92 having a passage 93 extending mesiodisally therethrough to receive a looped distal end 94 of a lingual arch wire 95. A tapered opening 96 extends mesiodistally through the body portion in communication with the occlusal side of passage 93, and a tapered wedge 97 is received in the opening to lock the distal end of the arch wire in passage 93. Preferably, wedge 97 has an occlusally extending head 98 which serves as a convenient gripping point when removing and installing the wedge.

A significant feature of the invention in its several forms is the use of a locking member which is readily engaged and released to secure an arch wire in the end tube. Both the wedge and the Allen screw are suitable forms of locking members for use with the end tube, and are easily manipulated by the orthodontist during installation, adjustment or removal of the arch wire. The need for fabrication and attachment of special latches, hooks, ligatures and other custom auxiliary appliances is thus completely eliminated, and the orthodontist is provided with a useful and easily handled end tube to anchor the en of an arch wire.

I claim:
1. In combination with an orthodontic arch wire having an end to be anchored, an improved end tube comprising
   a body portion having an elongated passage therethrough to receive the arch-wire end, the body portion forming a continuous enclosure around the arch wire whereby the arch wire is confined laterally of the passage and can be removed and installed only axially of the passage, the body portion further having an opening communicating with the passage;
   a locking member releasably engaged in the opening and urged against the arch-wire end to secure the arch wire to the body portion; and
   means for rigidly securing the body portion to a tooth whereby the end of the arch wire is in turn rigidly anchorable on the tooth.
2. The end tube defined in claim 1 in which the opening is threaded and locking member is a screw engaged in the opening and bearing on the arch-wire end.
3. The end tube defined in claim 1 in which the locking member is a wedge disposed in the opening between the body portion and arch-wire end.
4. The end tube defined in claim 3 in which the wedge is formed from a resilient plastic material.

5. The end tube defined in claim 3 in which the opening is tapered to receive the wedge in close-fitting relationship.

6. The end tube defined in claim 5 in which the wedge has an enlarged head.

7. The end tube defined in claim 1 in which said means comprises a tooth band rigidly secured to the body portion and adapted to fit on a molar tooth.

References Cited

UNITED STATES PATENTS

| 1,140,759 | 5/1915 | Montag | 32—14 |
| 3,085,335 | 4/1963 | Kesling | 32—14 |
| 3,158,934 | 12/1964 | Waldman | 32—14 |

ROBERT PESHOCK, Primary Examiner